(12) United States Patent
Rudberg et al.

(10) Patent No.: US 6,837,530 B2
(45) Date of Patent: Jan. 4, 2005

(54) STOWABLE SEAT ASSEMBLY HAVING A CENTER PIVOT

(76) Inventors: James Rudberg, 39433 Northwind Ct., Northville, MI (US) 48167; Kenneth Coatsworth, 14736 Hubbard, Livonia, MI (US) 48154

( * ) Notice: Subject to any disclaimer, the term of this patent is extended or adjusted under 35 U.S.C. 154(b) by 0 days.

(21) Appl. No.: 10/344,770

(22) PCT Filed: Aug. 17, 2001

(86) PCT No.: PCT/US01/25806
§ 371 (c)(1),
(2), (4) Date: Jul. 16, 2003

(87) PCT Pub. No.: WO02/14104
PCT Pub. Date: Feb. 21, 2002

(65) Prior Publication Data
US 2004/0026951 A1 Feb. 12, 2004

Related U.S. Application Data
(60) Provisional application No. 60/225,927, filed on Aug. 17, 2000.

(51) Int. Cl.$^7$ ................................................. B60N 2/02
(52) U.S. Cl. ..................... 296/65.09; 297/335; 297/325
(58) Field of Search ........................... 296/65.01, 65.05, 296/65.08, 65.09, 65.16, 65.17, 65.18; 297/92, 93, 15, 335, 336, 313, 325, 326, 327, 329

(56) References Cited

U.S. PATENT DOCUMENTS

| | | | | |
|---|---|---|---|---|
| 2,587,881 A | * | 3/1952 | Oakes | 297/327 |
| 2,771,124 A | * | 11/1956 | Osvaldo | 297/313 |
| 3,695,688 A | | 10/1972 | Wize | |
| 3,743,350 A | * | 7/1973 | Allen | 297/94 |
| 4,779,917 A | | 10/1988 | Campbell et al. | |
| 5,056,849 A | | 10/1991 | Norris, Jr. et al. | |
| 5,269,581 A | | 12/1993 | Odagaki et al. | |
| 5,570,931 A | | 11/1996 | Kargilis et al. | |
| 5,593,208 A | | 1/1997 | Mitschelen et al. | |
| 5,671,948 A | | 9/1997 | Susko et al. | |
| 5,738,411 A | | 4/1998 | Suttom et al. | |
| 5,975,612 A | | 11/1999 | Macey et al. | |
| 5,979,964 A | | 11/1999 | Ban et al. | |
| 6,106,046 A | | 8/2000 | Reichel | |
| 6,113,191 A | | 9/2000 | Seibold | |
| 6,179,362 B1 | | 1/2001 | Wisniewski et al. | |
| 6,209,943 B1 | | 4/2001 | Neale et al. | |
| 2003/0234551 A1 | * | 12/2003 | Taguchi et al. | 296/64 |

FOREIGN PATENT DOCUMENTS

JP  411048840 A  *  2/1999

* cited by examiner

*Primary Examiner*—D. Glenn Dayoan
*Assistant Examiner*—H. Gutman

(57) ABSTRACT

A seat assembly (10) for use in an automotive vehicle comprises a seat back (34) pivotally connected to a seat cushion (32) by a pair of recliner assemblies. The seat assembly is supported by and above the floor of the vehicle by a pair of center pivot assemblies (56, 58). The seat cushion is releasably supported by opposing sidewalls of the vehicle by front latch assemblies (60, 62). The recliner assemblies (52, 54) provide pivotal movement of the seat back (34) relative to the seat cushion (32) between an upright seating position and a forward folded flat position against the seat cushion. With the seat assembly in the folded flat position, the latch assemblies (60, 62) may be released to unlock the seat cushion from the sidewalls and allow the seat assembly to rotate about the center pivot assemblies (56, 58) from the folded flat position to a stowed position recessed within a storage cavity (16) within the floor of the vehicle.

11 Claims, 5 Drawing Sheets

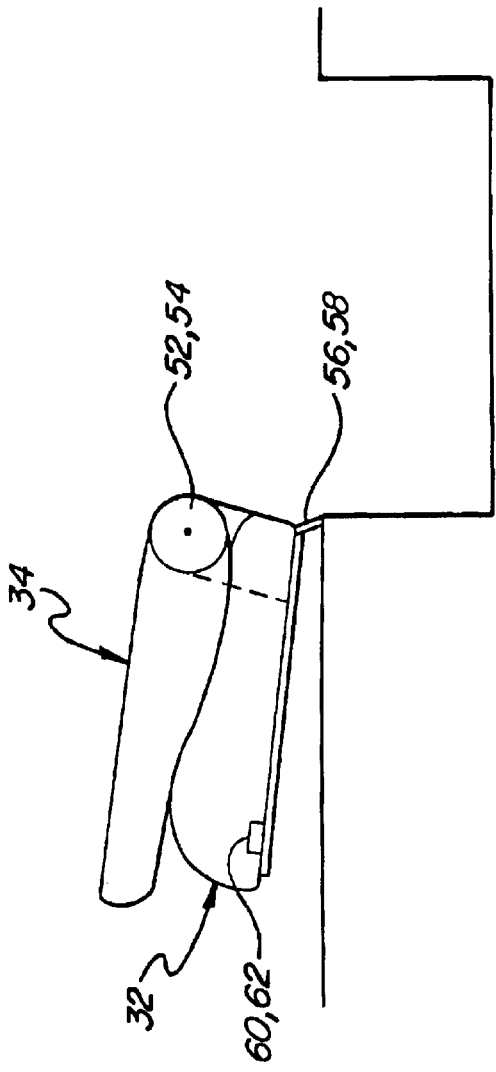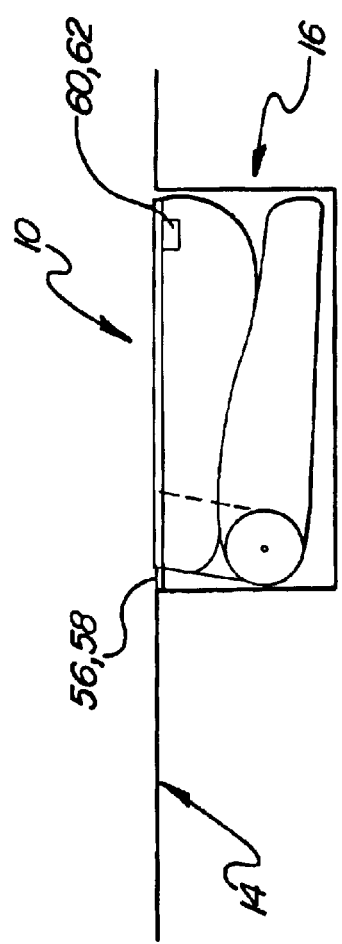

STOWABLE SEAT ASSEMBLY HAVING A CENTER PIVOT

This application claims the benefit of prov. application 60/225,927 filed on Aug. 17, 2000.

BACKGROUND OF THE INVENTION

1. Field of the Invention

The subject invention relates to seat assembly supported above a floor of an automotive vehicle and, more particularly, to a seat assembly having a pivot assembly for rotating the seat assembly from a seating position to a stowed position recessed in a cavity of the vehicle floor.

2. Description of the Related Art

A seat assembly for an automotive vehicle typically includes a generally upright seat back pivotally connected to a generally horizontal seat cushion for supporting an occupant in the seat. The seat cushion may be pivotally connected on one or both sides thereof—in some instances, the seat cushion is pivotally connected to one or two of the side walls of the vehicle by a pivot assembly. The seat cushion may also be releasably attached to the side walls by a latch assembly. The latch assembly and pivot assembly allow for the seat assembly to be released from the sidewalls and rotated into a storage cavity located in the floor. An example of such a seat assembly is disclosed in U.S. Pat. No. 5,269,581 issued Dec. 14, 1993 to ODAGAKI ET AL. Disclosed herein is a seat assembly having a seat cushion pivotally connected to two opposing sides of a vehicle for rotation between a forward seating position above a floor of the vehicle and a rearward stowed position within a storage cavity located below the floor of the vehicle. However, the pivot assembly mounted between the seat cushion and the side walls of the vehicle requires significant reinforcement of side walls of the vehicle, which impedes the cargo carrying capacity of the vehicle.

Therefore, it is desirable to provide a center pivot assembly connected to the seat cushion midway between the sidewalls of the vehicle for pivotally supporting the seat assembly and allowing for rotation of the seat assembly between an upright seating position and a stowed position recessed in the vehicle floor.

SUMMARY OF THE INVENTION

A seat assembly operatively supported by a floor and opposing sidewalls of an automotive vehicle includes a seat cushion and a seat back. A recliner assembly operatively connects the seat back and seat cushion for pivoting the seat back relative to the seat cushion between an upright seating position and a forwardly folded flat position against the seat cushion. A front latch assembly releasably connects the seat cushion to one of the sidewalls of the vehicle. A pivot assembly is secured to both the floor and the seat cushion between the side walls. The pivot assembly supports the seat assembly above the floor and allows the seat assembly to pivot to a stowed position recessed in a storage cavity below the vehicle floor when the seat back is in the folded flat position.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a schematic side view of the seat assembly incorporating one embodiment of the invention with the seat back in a folded flat position;

FIG. 4 is a schematic side view of the seat assembly in a stowed position recessed in the rear storage cavity within the vehicle floor;

DETAILED DESCRIPTION OF THE PREFERRED EMBODIMENT

Figure 1:
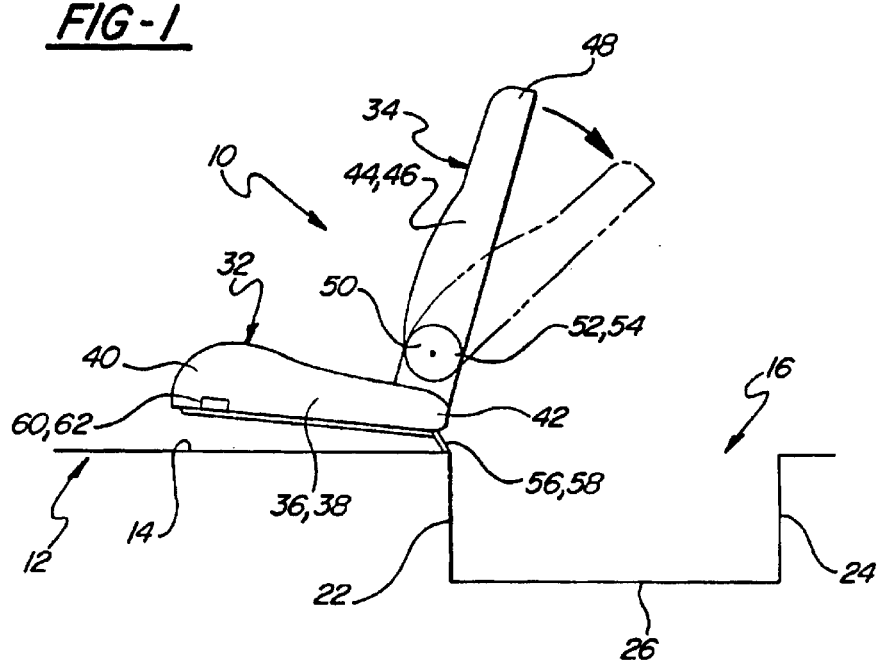
FIG. 1 is a schematic side view of an automotive vehicle seat assembly incorporating one embodiment of the invention.
Figure 2:
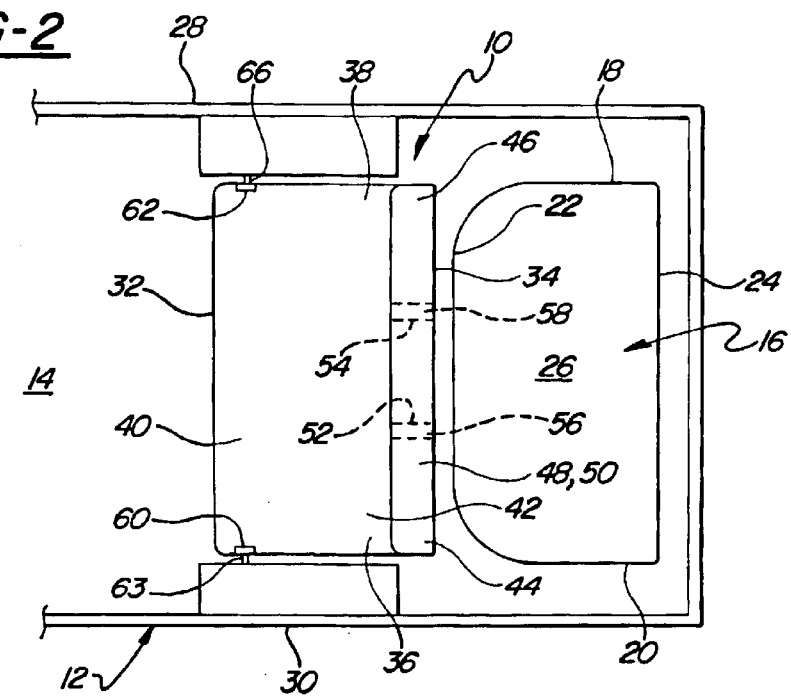
FIG. 2 is a schematic top view of the seat assembly and a rear storage cavity.

A seat assembly for use in an automotive vehicle is generally shown at 10 in FIGS. 1 and 2. The vehicle is generally shown at 12 in FIGS. 1 and 2 and includes a support floor 14 having a recessed storage cavity 16 formed in a rear portion thereof. The recessed storage cavity 16 includes vertical side walls 18, 20 spaced apart by vertical front and rear walls 22, 24 that are interconnected by a lower floor portion 26. The vehicle 12 further includes a pair of spaced apart sidewalls 28, 30 extending vertically from the floor 14.

The seat assembly 10 includes a seat cushion 32 and a seat back 34. The seat cushion 32 includes lateral side portions 36, 38 spaced apart by front and rear portions 40, 42. Still referring to FIGS. 1 and 2, the seat back 34 similarly includes lateral side bolsters 44, 46 spaced apart by top and bottom portions 48, 50. A pair of spaced apart recliner assemblies 52, 54 pivotally interconnect the bottom portion 50 of the seat back 34 to the rear portion 42 of the seat cushion 32.

The seat cushion 32 is supported by both the support floor 14 and the sidewalls 28, 30. Specifically, a pair of center pivot assemblies 56, 58 are operatively connected between the rear portion 42 of the seat cushion 32 and the support floor 14 for supporting the seat, cushion 32 above the floor 14. A seat cushion front latch 60, 62, of any suitable variety known to one skilled in the art, is fixedly secured to each of the side portions 36, 38 adjacent the front portion 40 of the seat cushion 32. Each front latch 60, 62 releasably engages a cooperating striker bar 63, 66 extending outwardly from each of the side walls 28, 30, respectively, for releasably supporting the seat cushion 32 to the side walls 28, 30 spaced above the floor 14.

The seat assembly 10 is shown in a forward seating position wherein the seat cushion 32 is secured to the sidewalls 18, 20 by the latches 60, 62 and supported above the support floor 14 by the pivot assemblies 56, 58 in a generally horizontal position. The seat back 34 extends generally upright from the rear portion 42 of the seat cushion 32 for supporting a seated occupant in an upright seating position.

Figure 8:
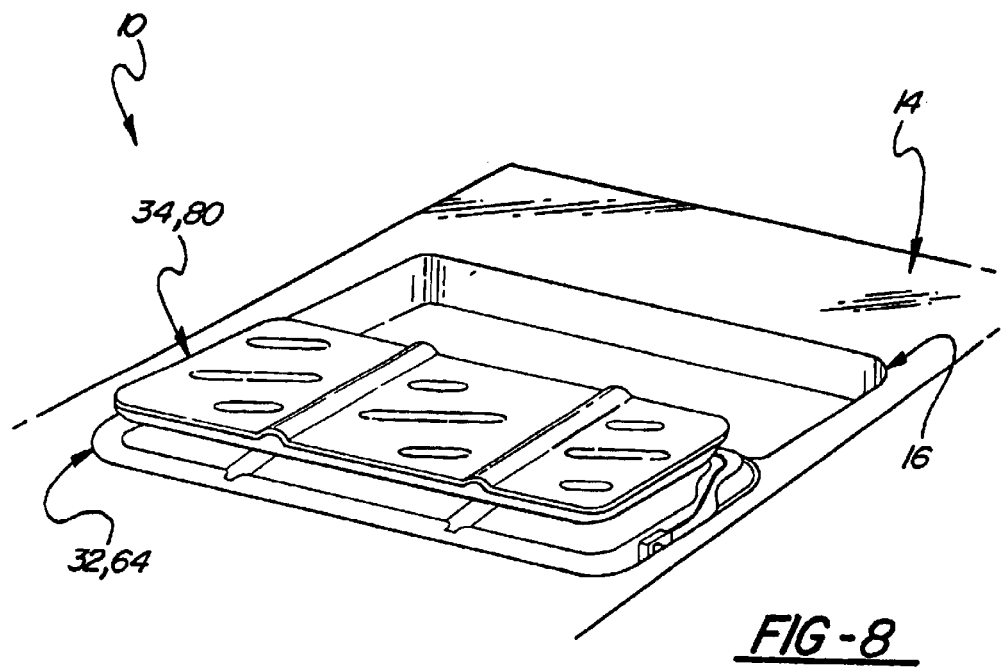
FIG. 8 is a perspective view of the seat assembly in the folded flat position.

The recliner assemblies 52, 54 allow pivotal adjustment of the seat back 34 relative to the seat cushion 32 between a plurality of reclined positions, as shown in FIG. 1, and a forward folded flat position pivoted against the seat cushion 32, as shown in FIG. 3 and FIG. 8.

Figure 5:
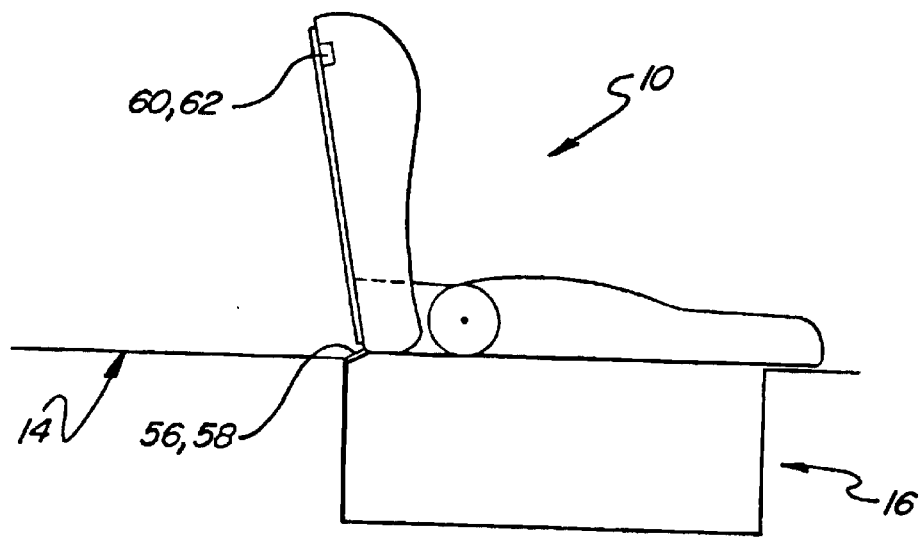
FIG. 5 is a schematic side view of the seat assembly in a rearward facing seating position.
Figure 9:
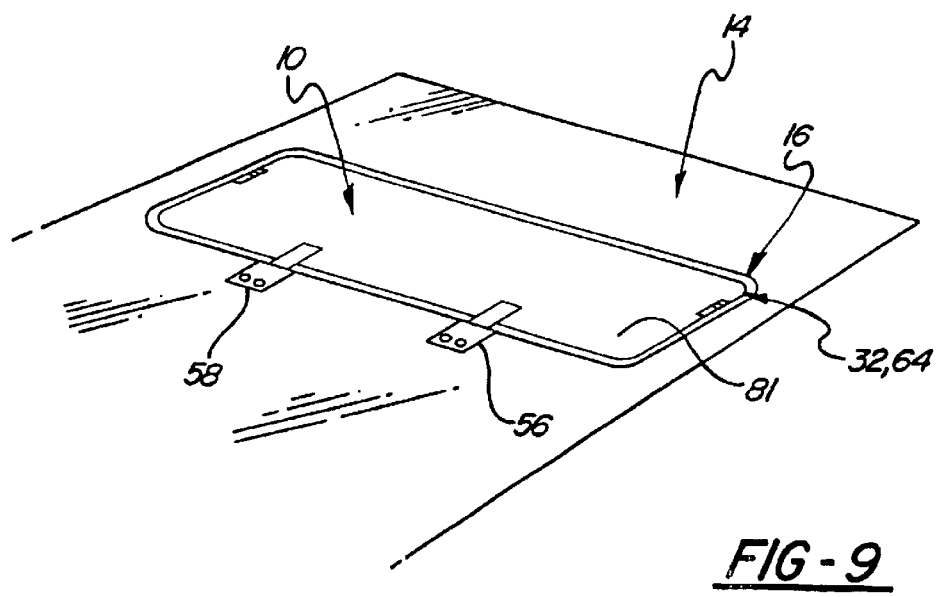
FIG. 9 is a perspective view of the seat assembly in the stowed position.

The invention relates to the latches 60, 62 and center pivot assemblies 56, 58 which allow movement of the seat assembly 10 from the forward seating position, as shown in FIG. 1, to a stowed position stored within the recessed cavity 16 of the floor 14, as shown in FIG. 4 and FIG. 9. Alternatively, the seat assembly 10 is moveable between the seating position, as shown in FIG. 1, and a rearward seating position, as shown in FIG. 5.

Figure 6:
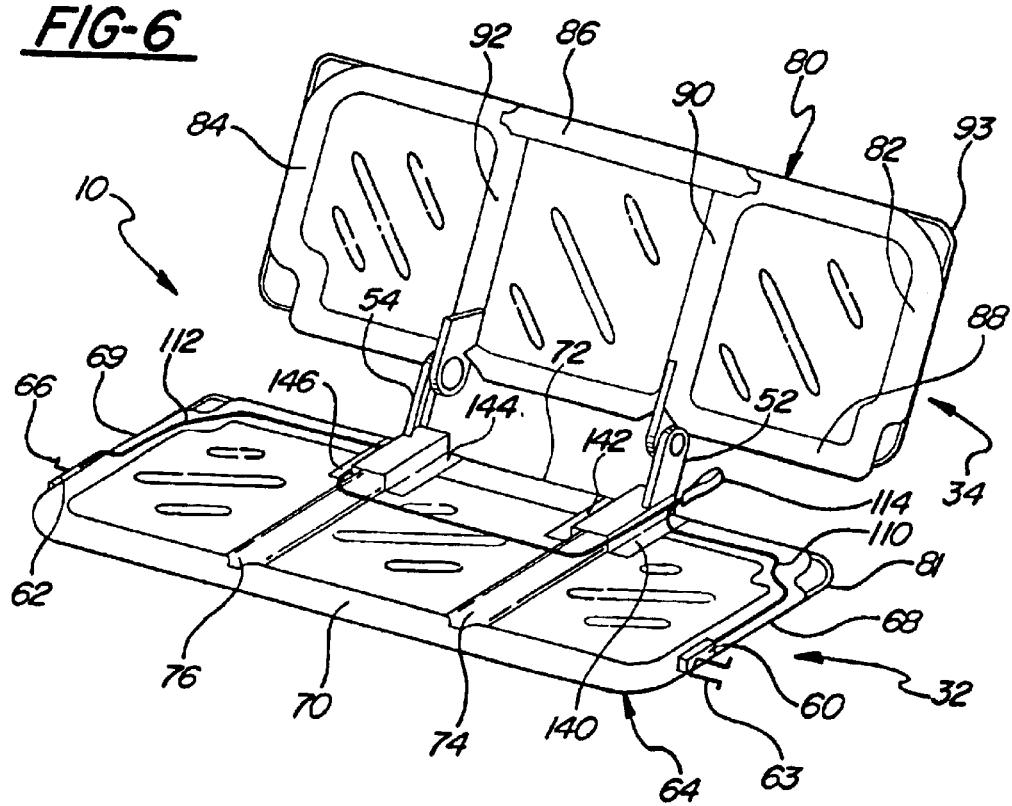
FIG. 6 is a perspective view of the seat assembly incorporating one embodiment of the invention in a forward seating position.

Referring to one embodiment of a seat assembly 10 in FIG. 6, the seat cushion 32 includes a seat cushion frame 64 defined by outboard tubular side members 68, 69 spaced apart and interconnected by front and rear tubular members 70, 72. A pair of spaced apart and parallel cross support members 74, 76 are positioned generally midway between the side members 66, 68 and extend between the tubular front and rear members 70, 72 for providing additional structural support to the seat cushion frame 64. The seat cushion frame 64 further includes a generally planar stamped support plate 81 fixedly secured to each of the side members 68, 69, front and rear tubular members 70, 72, and the cross support members 74, 76, by welds or the like.

The seat back 34 similarly includes a seat back frame 80 defined by outboard tubular side members 82, 84 spaced apart and interconnected by top and bottom tubular members 86, 88. A pair of spaced apart and parallel cross support members 90, 92 are positioned generally midway between the side members 82, 84 and extend between the tubular top and bottom members 86, 88 for providing additional structural support to the seat back frame 80. The seat back frame 80 also includes a generally planar stamped support plate 93 fixedly secured to the side members 82, 84, the top and bottom tubular members 86, 88, and the cross support members 90, 92.

Figure 7:
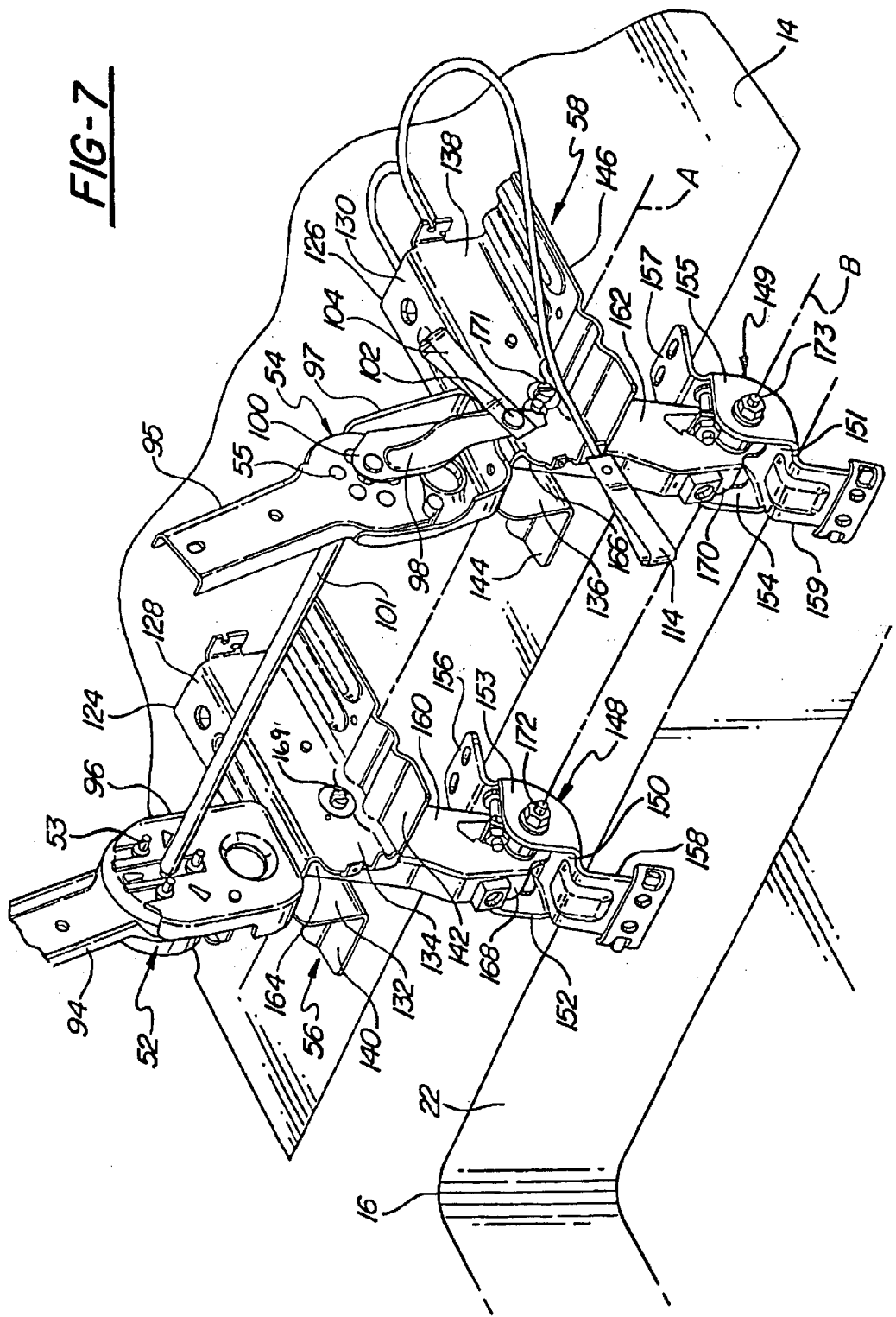
FIG. 7 is a perspective view of one embodiment of the invention including a pair of recliners for pivotally connecting the seat back and seat cushion and the center pivot assemblies of the seat assembly.

Referring to FIG. 6, the recliner assemblies 52, 54 are fixedly attached at a cushion end near the seat cushion cross support members 74, 76 and at an opposite, back end near the seat back cross support members 90, 92, thereby interconnecting the seat cushion frame 64 and the seat back frame 80. Specifically, as best shown in FIG. 7, each recliner assembly 52, 54 is connected to the seat back 34 by an upper pivot bracket 94, 95, respectively. The upper pivot brackets 94, 95 are fixedly secured to a respective cross support member 90, 92 of the seat back frame 80.

Each of the recliner assemblies 52, 54 include a disc recliner 53, 55 operatively interconnecting the upper brackets 94, 95 and the lower brackets 96, 97. An example of such a recliner is disclosed in applicant's PCT application CA 99/00653, published Feb. 10, 2000, which is expressly incorporated herein by reference in its entirety. The disc recliners 53, 55 are operable between locked and unlocked states and preferably biased in the locked state. In the locked state, the position of the seat back 34 is fixed relative to the seat cushion 32. In the unlocked state, the seat back 34 may be rotatably adjusted relative to the seat cushion 32.

The seat assembly 10 includes a release handle 98, having opposite proximal and distal ends 100, 102, for selectively allowing the disc recliners 53, 55 to operate between the locked and unlocked states. The proximal end 100 is secured to the disc recliner 55. A release strap 104 is connected to the distal end 102 by any suitable means. A rod 101 extends between and links each of the disc recliners 53, 55. The rod 101 provides for generally synchronous operation of both of the disc recliners 53, 55 between their respective locked and unlocked states.

Referring back to FIG. 6, the latches 60, 62 are fixedly attached to the seat cushion side members 68, 69, respectfully, adjacent to the front cross member 70 of the seat cushion frame 64. The latch assemblies 60, 62 are released by cable assemblies 110, 112, as shown in FIG. 6. Each cable assembly 110, 112 is fixedly attached at one end to each of the latches 60, 62. A release tether 114 is fixedly attached, by an suitable means, at the opposite end of each of the cable assemblies 110, 112. The single release tether 114 allows concurrent operation of both latches 60, 62 to selectively release the respective striker bar 63, 66.

As shown in FIG. 7, each of the center pivot assemblies 56, 58 include a generally U-shaped cushion bracket 124, 126, respectively. Each of the cushion brackets 124, 126 includes an inboard plate 134, 136 and an outboard plate 132, 138 spaced apart and generally parallel to the inboard plate 134, 136. An upper plate 128, 130 interconnects and is generally normal to both the inboard plate 134, 136 and the outboard plate 132, 138. A flange 140, 142, 144, 146 extends outwardly from each of the inboard and outboard side plates 132, 134, 136, 138 and is generally parallel to the upper plate 128, 130. As best shown in FIG. 6, the flanges 140, 142, 144, 146 are fixedly secured to the rear tubular member 72 by any suitable method such as by bolting, welding, or the like, thereby securing the center pivot assemblies 56, 58 to the seat cushion frame 64. Referring back to FIG. 7, each of the lower pivot brackets 96, 97 of the recliner assemblies 52, 54 are fixedly secured by weld, bolt, or the like, to the upper plate 128, 130 of the respective cushion bracket 124, 126.

The pivot assemblies 56, 58 further include floor brackets 148, 149 each having an arcuate base plate 150, 151 supporting a pair of spaced apart generally parallel flanges 152, 153, 154, 155 extending outwardly therefrom. Each floor bracket 148, 149 further includes an upper attachment flange 156, 157 and a lower attachment flange 158, 159 located at and extending from opposite ends of the arcuate base plate 150, 151. The upper attachment flange 156, 158 is fixedly secured to the floor 14 while the lower attachment flange 158, 159 is fixedly secured to the front wall 22 of the cavity 16.

Each pivot assembly 56, 58 additionally includes an elongated link 160, 162, having a first end 164, 166 and an opposite second end 168, 170, that interconnects the cushion bracket 124, 126 to the respective floor bracket 148, 149. The first end 164, 166 is seated between and rotatably connected by a pivot pin 169, 171 to both the inboard plate 134, 136 and outboard plate 132, 138, defining a pivot axis A. Similarly, the second end 168, 170 is seated between the flanges 152, 153, 154, 155 of the respective floor bracket 148, 149. A pivot pin 172, 173 extends through the flanges 152, 153, 154, 155 and the second end 168, 170 along a pivot axis B and retains the second end 168, 170 in the floor bracket 148, 149.

In operation, the seat assembly 10 can be moved from the seating position, as shown in FIG. 1, to the stowed position, as shown in FIGS. 4 and 9, by pulling on the release strap 104. Pulling the release strap 104 causes rotation of the release handle 98 which, in turn, actuate both of the recliner assemblies 52, 54 between the locked and unlocked states. In the unlocked state, the seat back 34 is free to rotate relative to the seat cushion 32 into the folded flat position against the seat cushion 32, as shown in FIGS. 3 and 8. The release tether 114 is then pulled to release the front latches 60, 62 out of engagement with the striker bars 63, 66. Once the front latches 60, 62 are disengaged from the striker bars 63, 66, the seat assembly 10 may then be supported and rotated about the pivot axes A, B of the center pivot assemblies 120, 122. Specifically, the seat cushion 32 and seat back 34 may be rotated rearwardly first about the pivot axis A. As the seat cushion and seat back 32, 34 are rotated, the upper plate 128, 130 eventually contacts the link 160, 162 and prevents further rotation about pivot axis A. Rotation of the seat cushion and seat back 32, 34 then continues about pivot axis B until the seat cushion and seat back 32, 34 nest into the recessed storage cavity 16 in the floor 14, as shown in FIG. 9. The support plate 81 is flush with the vehicle floor 14 to create a generally planar, flat load floor, as shown in FIGS. 4 and 9.

Alternatively, the seat assembly 10 is moveable between the seating position, as shown in FIG. 1, and the rear facing seating position, as shown in FIG. 5. To accomplish this, the recliner assemblies 52, 54 are maintained in the locked state to hold the seat back 34 in the upright seating position relative to the seat cushion. The release tether 114 for the front latches 60, 62 is then actuated with the seat back 34 locked in the upright position, as shown in FIG. 1. The seat assembly 10 may then be rotated rearwardly, or clockwise as viewed in FIG. 1, about the pivot axis B until the seat back 34 contacts and is supported by a portion of the floor 14 rearward of the recess 16, as shown in FIG. 5. In this configuration, the seat back 34 becomes generally horizontal and the seat cushion 32 becomes generally vertical, defining the rearward facing seat position. Further, the seat back 34 substantially covers the recess 16 in the floor 14.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A seat assembly for an automotive vehicle having opposing sidewalls and a vehicle floor having a recessed storage cavity, said seat assembly comprising:
   a seat cushion;
   a seat back pivotally movable between a generally upright seating position and a fold flat position disposed against said seat cushion;
   a recliner assembly extending between an upper pivot bracket fixedly secured to said seat back and a lower pivot bracket fixedly secured to said seat cushion for pivoting said seat back relative to said seat cushion between said upright seating position and said fold flat position; and
   a pivot assembly extending between the vehicle floor adjacent the recessed storage cavity and said seat cushion for selectively pivoting said seat assembly from a seating position disposed between the vehicle sidewalls with said seat back in said upright seating position to a stowed position disposed within the recessed storage cavity with said seat back in said fold flat position and for selectively pivoting said seat assembly from said seating position to a rear facing position with said seat back supported on the vehicle floor covering the recessed storage cavity and said seat cushion extending generally upright from said seat back.

2. A seat assembly as set forth in claim 1 wherein said pivot assembly includes a floor bracket fixedly secured to the vehicle floor and disposed adjacent the recessed storage cavity, a cushion bracket fixedly secured to said seat cushion, and a link having a first end pivotally connected to said cushion bracket defining a cushion pivot axis and a second end pivotally connected to said floor bracket defining a floor pivot axis such that said seat cushion sequentially pivots about said cushion pivot axis and said floor pivot axis when said seat cushion is moved from said seating position to said stowed position disposed inside the recessed storage cavity.

3. A seat assembly as set forth in claim 2 wherein said seat back defines a seat back length wherein combined with the length of said pivot assembly is greater than the width of the recess storage cavity such that said seat back covers the recessed storage cavity and is supported by the vehicle floor in the rear facing position.

4. A seat assembly as set forth in claim 3 including a latch to release said seat cushion from said seating position to pivot about said pivot assembly independent of said pivotal movement of said seat back.

5. A seat assembly as set forth in claim 4 wherein said seat cushion includes lateral side portions and said pivot assembly is spaced equidistantly between said lateral side portions.

6. A seat assembly as set forth in claim 5 wherein said recliner assembly includes a disc recliner operatively coupled between said upper and lower pivot brackets for selectively locking said seat back in said upright seating position and said fold flat position.

7. A seat assembly as set forth in claim 6 wherein said cushion bracket includes an upper plate for abutting said link during pivotal movement of said seat cushion from said seating position toward said stowed position to sequentially transfer pivotal movement of said seat cushion from said cushion pivot axis to said floor pivot axis.

8. A seat assembly as set forth in claim 7 wherein said seat cushion includes a seat cushion frame defined by outboard tubular side members spaced apart and interconnected by front and rear tubular members.

9. A seat assembly as set forth in claim 8 wherein said seat cushion includes a pair of spaced apart and parallel cross support members position generally equidistance between said side members and extending between said front and rear members.

10. A seat assembly as set forth in claim 9 wherein said seat back includes a seat back frame defined by outboard tubular side members spaced apart and interconnected by top and bottom tubular members.

11. A seat assembly as set forth in claim 10 wherein said seat back includes a pair of spaced apart and parallel cross support members position generally equidistance between said side members and extending between said top and bottom members.

* * * * *

UNITED STATES PATENT AND TRADEMARK OFFICE
CERTIFICATE OF CORRECTION

PATENT NO. : 6,837,530 B2
DATED : January 4, 2005
INVENTOR(S) : Rudberg et al.

It is certified that error appears in the above-identified patent and that said Letters Patent is hereby corrected as shown below:

Column 2,
Line 51, please delete the comma after "seat".

Column 6,
Line 41, please delete "seating" and insert -- seat --.

Signed and Sealed this

Twelfth Day of April, 2005

JON W. DUDAS
*Director of the United States Patent and Trademark Office*